United States Patent
Delaney, Jr. et al.

(10) Patent No.: US 12,527,871 B2
(45) Date of Patent: Jan. 20, 2026

(54) CLICK CHEMISTRY CAPTURABLE PLATINUM-BASED ANTINEOPLASTIC AGENTS

(71) Applicant: Boston Scientific Scimed, Inc., Maple Grove, MN (US)

(72) Inventors: Joseph Thomas Delaney, Jr., Minneapolis, MN (US); Sarah Melissa Gruba, Vadnais Heights, MN (US); Tatyana Dyndikova, Minneapolis, MN (US); Paul Vincent Grosso, Maple Grove, MN (US); Amanda Maxwell, Minnetonka, MN (US); Ajay Gupta, Minneapolis, MN (US); Andrew J. Ro, Plymouth, MN (US); Douglas Pennington, Stillwater, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 32 days.

(21) Appl. No.: 17/616,576

(22) PCT Filed: May 11, 2020

(86) PCT No.: PCT/US2020/032371
§ 371 (c)(1),
(2) Date: Dec. 3, 2021

(87) PCT Pub. No.: WO2020/247151
PCT Pub. Date: Dec. 10, 2020

(65) Prior Publication Data
US 2022/0249676 A1    Aug. 11, 2022

Related U.S. Application Data

(60) Provisional application No. 62/857,618, filed on Jun. 5, 2019.

(51) Int. Cl.
| | | |
|---|---|---|
| A61K 47/55 | (2017.01) | |
| A61K 47/54 | (2017.01) | |
| A61M 1/16 | (2006.01) | |

(52) U.S. Cl.
CPC ............ *A61K 47/552* (2017.08); *A61K 47/54* (2017.08); *A61K 47/545* (2017.08); *A61M 1/1678* (2013.01)

(58) Field of Classification Search
CPC .................................................. A61K 47/552
See application file for complete search history.

(56) References Cited

U.S. PATENT DOCUMENTS

| | | |
|---|---|---|
| 3,660,464 A | 5/1972 | Bernstein et al. |
| 5,593,660 A | 1/1997 | Krause et al. |

(Continued)

FOREIGN PATENT DOCUMENTS

| | | |
|---|---|---|
| DE | 4344464 W | 6/1995 |
| EP | 1815871 | 8/2007 |

(Continued)

OTHER PUBLICATIONS

By Sigmann-Lounda et al ((2004). Polymeric Platinum-Containing Drugs in the Treatment of Cancer. In Macromolecules Containing Metal and Metal-Like Elements (eds A.S. Abd-El-Aziz, C.E. Carraher, C.U. Pittman, J.E. Sheats and M. Zeldin). https://doi.org/10.1002/0471683779.ch7). (Year: 2004).*

(Continued)

*Primary Examiner* — Benjamin J Packard
(74) *Attorney, Agent, or Firm* — Pauly, DeVries Smith Deffner LLC

(57) ABSTRACT

A chemotherapy agent comprising a chemotherapy group and a ligand secured to the chemotherapy group is disclosed, the ligand comprising a reactive group capable of bonding to a capture substrate. A method of removing chemotherapy (Continued)

agents from a patient is disclosed, the method comprising providing a chemotherapy agent containing a reactive group; providing a capture substrate in contact with a patient's bloodstream; administering the chemotherapy agent to the patient; and sequestering the chemotherapy agent on the capture substrate. A system for removing chemotherapy agents is also disclosed.

12 Claims, 5 Drawing Sheets

(56) References Cited

U.S. PATENT DOCUMENTS

| | | | |
|---|---|---|---|
| 5,622,687 | A | 4/1997 | Krishnan et al. |
| 7,771,705 | B2 | 8/2010 | Zhao |
| 8,545,813 | B2 | 10/2013 | Song et al. |
| RE47,121 | E | 11/2018 | Goupil et al. |
| 11,213,596 | B2 | 1/2022 | Delaney et al. |
| 11,224,666 | B2 | 1/2022 | Delaney et al. |
| 2005/0036946 | A1 | 2/2005 | Pathak et al. |
| 2005/0271727 | A1 | 12/2005 | Yao |
| 2007/0248547 | A1 | 10/2007 | Brasch et al. |
| 2008/0181847 | A1 | 7/2008 | Robillard et al. |
| 2008/0228124 | A1 | 9/2008 | Lamps et al. |
| 2016/0030592 | A1 | 2/2016 | Moreadith et al. |
| 2016/0346409 | A1 | 12/2016 | Valliant et al. |
| 2019/0247523 | A1 | 8/2019 | Delaney et al. |
| 2019/0275178 | A1 | 9/2019 | Delaney et al. |
| 2021/0022743 | A1 | 1/2021 | Delaney et al. |

FOREIGN PATENT DOCUMENTS

| | | |
|---|---|---|
| EP | 3752205 | 12/2020 |
| EP | 3765096 | 1/2021 |
| WO | 9310824 | 6/1993 |
| WO | 9614878 | 5/1996 |
| WO | 2008101166 | 8/2008 |
| WO | 2010068862 | 6/2010 |
| WO | 2011017690 | 2/2011 |
| WO | 2011140392 | 11/2011 |
| WO | 2012001532 | 1/2012 |
| WO | 2013170272 | 11/2013 |
| WO | 2015033092 | 3/2015 |
| WO | 2015154082 | 10/2015 |
| WO | 2016055812 | 4/2016 |
| WO | 2016071418 | 5/2016 |
| WO | 2017143277 | 8/2017 |
| WO | 2019161051 | 8/2019 |
| WO | 2019177740 | 9/2019 |
| WO | 2020247151 | 12/2020 |

OTHER PUBLICATIONS

"Final Office Action," for U.S. Appl. No. 16/276,169 mailed May 15, 2020 (18 pages).
"Final Office Action," for U.S. Appl. No. 16/276,174 mailed Jan. 15, 2021 (27 pages).
"International Preliminary Report on Patentability," for PCT Application No. PCT/US2018/018005 mailed Aug. 27, 2020 (9 pages).
"International Preliminary Report on Patentability," for PCT Application No. PCT/US2019/018007 mailed Sep. 24, 2020 (11 pages).
"International Preliminary Report on Patentability," for PCT Application No. PCT/US2020/032371 mailed Dec. 16, 2021 (8 pages).
"International Search Report and Written Opinion," for PCT Application No. PCT/US2018/018005 mailed Oct. 24, 2019 (12 pages).
"International Search Report and Written Opinion," for PCT Application No. PCT/US2019/018007 mailed Jun. 19, 2019 (18 pages).
"International Search Report and Written Opinion," for PCT Application No. PCT/US2020/032371 mailed Jul. 28, 2020 (12 pages).
"Non-Final Office Action," for U.S. Appl. No. 16/276,169 mailed Feb. 6, 2020 (23 pages).
"Non-Final Office Action," for U.S. Appl. No. 16/276,169 mailed Mar. 30, 2021 (17 pages).
"Non-Final Office Action," for U.S. Appl. No. 16/276,174 mailed Jun. 26, 2020 (32 pages).
"Notice of Allowance," for U.S. Appl. No. 16/276,169 mailed Sep. 3, 2021 (11 pages).
"Notice of Allowance," for U.S. Appl. No. 16/276,174 mailed Sep. 2, 2021 (12 pages).
"Response to Communication Pursuant to Rules 161(1) and 162 EPC," for European Patent Application No. 19707637.5 filed Apr. 1, 2021 (10 pages).
"Response to Communication Pursuant to Rules 161(1) and 162 EPC," for European Patent Application No. 19707638.3 filed May 12, 2021 (12 pages).
"Response to Final Rejection," mailed on Jan. 15, 2021 for U.S. Appl. No. 16/276,174, submitted via EFS-Web on Apr. 15, 2021, 11 pages.
"Response to Final Rejection," mailed on May 15, 2020 for U.S. Appl. No. 16/276,169, submitted via EFS-Web on Aug. 17, 2020, 9 pages.
"Response to Non-Final Rejection," mailed on Feb. 6, 2020 for U.S. Appl. No. 16/276,169, submitted via EFS-Web on May 4, 2020, 9 pages.
"Response to Non-Final Rejection," mailed on Jun. 26, 2020 for U.S. Appl. No. 16/276,174, submitted via EFS-Web on Sep. 28, 2020, 10 pages.
"Response to Non-Final Rejection," mailed on Mar. 30, 2021 for U.S. Appl. No. 16/276,169, submitted via EFS-Web on Jun. 30, 2021, 8 pages.
Abi-Aad, K. R., et al. "New Generation Hydrogel Endovascular Aneurysm Treatment Trial (HEAT): a study protocol for a multi-center randomized controlled trial," Neuroradiology 2018, 60(10), 1075-1084 (10 pages).
Bjerknes, Matthew, et al. "Facile Quenching and Spatial Patterning of Cyclooctynes via Strain-Promoted Alkyne-Azide Cycloaddition of Inorganic Azides," Bioconjugate Chem. 2017, 28, 1560-1565 (6 pages).
Buncherd, Hansuk, et al. "Selective Enrichment and Identification of Cross-Linked Peptides to Study 3-D Structures of Protein Complexes by Mass Spectrometry," Journal of Proteomics 75 (2012) 2205-2215 (11 pages).
Chang, Hyeonsoo, et al. "Whole Blood Reflectance for Assessment of Hematologic Condition and Detection of Angiographic Contrast Media," Applied Optics, May 1, 2009, vol. 48 No. 13, 2435-2443 (9 pages).
Grogna, Mathurin, et al. "Stealth macromolecular platforms for the design of MRI blood pool contrast agents," Polym. Chem. 2011, 2, 2316-27 (12 pages).
Hapuarachchige, Sudath, et al. "Click Chemistry in the Development of Contrast Agents for Magnetic Resonance Imaging," Topics In Magnetics Resonance Imaging, vol. 25, No. 5, Oct. 1, 2016 pp. 205-213 (20 pages).
Kobayashi, Hisataka, et al. "Activated Clearance of a Biotinylated Macromolecular MRI Contrast Agent from the Blood Pool using an Avidin Chase," Bioconjugate Chemistry, vol. 14, No. 5, Sep. 1, 2003 pp. 1044-1047 (4 pages).
Liu, Hui, et al. "Ultrafast Click Chemistry with Fluorosydnones," Agnew. Chem. Int. Ed. Engl. 2016, 55(39), 12073-7 (5 pages).
Ojima, Iwao, et al. "Quest for Efficacious Next-Generation Taxoid Anticancer Agents and Their Tumor-Targeted Delivery," J. Nat. Prod. 2018, 81, 703-721 (19 pages).
Oun, Rabbab, et al. "The side effects of platinum-based chemotherapy drugs: a review for chemists," Dalton Trans., 2018, 47, 6645-6653 (10 pages).
Parrillo, Viviana, et al. "Catalyst-Free "Click" Functionalization of Polymer Brushes Preserves Antifouling Properties Enabling Detection in Blood Plasma," Analytica Chimica Acta. Jun. 8, 2017;971:78-87 (10 pages).
Pokorski, Jonathan K, et al. "Functional Virus-Based Polymer-Protein Nanoparticles by Atom Transfer Radical Polymerization," J Am Chem Soc, 2011. 133(24): 9242-5 (11 pages).

(56) References Cited

OTHER PUBLICATIONS

Ramil, Carlo P., et al. "Bioorhogonal Chemistry: strategies and recent development," Chem Commun (Camb). Dec. 7, 2013; 49(94): 11007-11022 (30 pages).
Rogosnitzky, Moshe, et al. "Gadolinium-based Contrast Agent Toxicity: a Review of Known and Proposed Mechanisms," Biometals (2016) 29:365-376 (12 pages).
Santra, Santimukul, et al. "Aliphatic Hyperbranched Polyester: A New Building Block in the Construction of Multifunctional Nanoparticles and Nanocomposites," Langmuir 2010, 26(18), 5364-73 (10 pages).
Sletten, E. M., et al. "From Mechanism to Mouse: a tale of two bioorthogonal reactions," Acc. Chem. Res. 2011, 44(9), 666-76 (11 pages).
Sukerkar, Preeti A., et al. "Synthesis and Biological Evaluation of Water-soluble Progesterone-Conjugated Probes for Magnetic Resonance Imaging of Hormone Related Cancers," Bioconjug Chem, 2011. 22(11): 2304-16 (26 pages).
Tan, Mingqian, et al. "Peptide-Targeted Nanoglobular Gd-DOTA Monoamide Conjugates for Magnetic Resonance Cancer Molecular Imaging," Biomacromolecules, 2010. 11(3): 754-61 (8 pages).
Toppino, Antonio, et al. "A carborane-Derivative "Click" Reaction under Heterogeneous Conditions for the Synthesis of a Promising Lipophilic MRI/GdBNCT Agent," Chemistry, 2013. 19(2): 721-8 (8 pages).
Vanasschen, Christian, et al. "Gadolinium DOTA Chelates Featuring Alkyne Groups Directly Grafted on the Tetraaza Macrocyclic Ring: Synthesis, Relaxation Properties, "Click" Reaction, and High-Relaxivity Micelles," Inorg Chem, 2011. 50(18): 8946-58 (13 pages).
Verwilst, Peter, et al. "A Modular Approach towards the Synthesis of Target-Specific MRI Contrast Agents," European Journal of Inorganic Chemistry, 2011. 2011(24): 3577-85 (9 pages).
Xu, J., et al. "Bioorthogonally cross-linked hydrogel networked with precisely controlled disintegration time over a broad range," J. Am. Chem. Soc. 2014, 136(11), 4105-8 (4 pages).
Yantasee, W., et al. "Novel sorbents for removal of gadolinium-based contrast agents in sorbent dialysis and hemoperfustion: preventive approaches to nephrogenic systemic fibrosis," Nanomedicine: Nanotechnology, Biology and Medicine, Elsevier, NL, vol. 6, No. 1, Feb. 1, 2010 pp. 1-8 (8 pages).
"Non-Final Office Action," for U.S. Appl. No. 16/935,963 mailed May 10, 2023 (27 pages).
"Response to Communication Pursuant to Rules 161(1) and 162 EPC," for European Patent Application No. 20729461.2 filed Jun. 30, 2022 (36 pages).
Agard, Nicholas J., et al."A Strain-Promoted [3 + 2] Azide-Alkyne Cycloaddition for Covalent Modification of Biomolecules in Living Systems," J. Am. Chem. Soc. 2004, 126, 15046-15047 (2 pages).
Jiang, Huafang, et al."An Injectable and Fast-Degradable Poly(ethylene glycol) Hydrogel Fabricated via Bioorthogonal Strain-Promoted Azide-Alkyne Cycloaddition Click Chemistry," Soft Matter, 2015, 11, 6029-6036 (8 pages).
Kallmes, David F., et al."New Expandable Hydrogel-Platinum Coil Hybrid Device for Aneurysm Embolization," ANJR Am. J. Neuroradiol. 23: 1580-1588, Oct. 2002 (9 pages).
Madani, Faten, et al."PEGylation of Microspheres for Therapeutic Embolization: Preparation, Characterization and Biological Performance Evaluation," Biomaterials 28 (2007) 1198-1208 (11 pages).
"Final Office Action," for U.S. Appl. No. 16/935,963 mailed Oct. 24, 2023 (18 pages).
"Response to Final Rejection," mailed on Oct. 24, 2023, for U.S. Appl. No. 16/935,963, submitted via EFS-Web on Jan. 24, 2024, 10 pages.
"Response to Non-Final Rejection," mailed on May 10, 2023, for U.S. Appl. No. 16/935,963, submitted via EFS-Web on Aug. 10, 2023, 13 pages.
"Communication pursuant to Article 94(3) EPC," for European Patent Application No. 20729461.2 mailed Feb. 12, 2024 (6 pages).
"Non-Final Office Action," for U.S. Appl. No. 16/935,963 mailed May 15, 2024 (19 pages).
"Office Action," for European Patent Application No. 19707638.3 mailed Mar. 19, 2024 (7 pages).
"Response to Non-Final Rejection," mailed on May 15, 2024, for U.S. Appl. No. 16/935,963, submitted via Patent Center on Aug. 15, 2024, 8 pages.
"Communication pursuant to Article 94(3) EPC," for European Patent Application No. 20729461.2 mailed Sep. 19, 2024 (5 pages).
"Final Office Action," for U.S. Appl. No. 16/935,963 mailed Oct. 17, 2024 (20 pages).
"Response to Communication pursuant to Article 94(3) EPC," for European Patent Application No. 20729461.2 filed Jan. 14, 2025 (37 pages).
"Response to Final Rejection," mailed on Oct. 17, 2024, for U.S. Appl. No. 16/935,963, submitted via Patent Center on Jan. 15, 2025, 8 pages.
"Response to Office Action," for European Patent Application No. 19707638.3 filed Sep. 13, 2024 (12 pages).

* cited by examiner

CLICK CHEMISTRY CAPTURABLE PLATINUM-BASED ANTINEOPLASTIC AGENTS

This application is a national stage application under 35 U.S.C. 371 of PCT International Patent Application Serial No. PCT/US2020/032371, filed May 11, 2020, which claims priority to U.S. Provisional Application No. 62/857,618, filed Jun. 5, 2019, the contents of which are herein incorporated by reference in its entirety.

FIELD OF THE INVENTION

The present technology generally relates to chemotherapy agents, including chemotherapy agents modified to be scavenged from a patient, as well as methods and systems for scavenging chemotherapy agents from a patient.

BACKGROUND

Many chemotherapy agents, also referred to as antineoplastics, are effective at killing cancer cells but have very significant and sometimes severe side effects on non-targeted tissue. For example, platinum-based chemotherapy agents, such as cisplatin and carboplatin, are widely prescribed chemotherapy agents to treat different cancers. These chemotherapy agents are used in roughly half of chemotherapy regimens worldwide and several are included in the World Health Organization (WHO) model lists of essential medicines. While they are effective at treating tumors and improving survival rates, their use is limited by severe, dose-limiting side effects (also referred to as adverse effects/events). These side effects can include, for example, ototoxicity, cardiotoxicity, nephrotoxicity, hepatotoxicity, and neurotoxicity. In total, a cancer patient can experience any combination of around forty specific side effects. Similarly, anthracyclines, such as doxorubicin, are effective anticancer chemotherapy agents against many types of cancer, but they also kill cardiomyocytes, making cardiotoxicity a major off-target effect limiting their use. For this reason, it is also listed in the NIOSH list of antineoplastic and other hazardous drugs in healthcare settings.

Therefore, a need exists to limit the side effects of chemotherapy agents upon non-target tissues.

SUMMARY

This disclosure is directed, in a first aspect, to a functionalized chemotherapy agent, the functional chemotherapy agent includes a chemotherapy group and a ligand secured to the chemotherapy group, the ligand can include a reactive group capable of bonding to a capture molecule on a capture substrate.

In a second aspect, in addition to one or more of the preceding or following aspects, or in the alternative to some aspects, the chemotherapy group includes a platinum-based antineoplastic agent.

In a third aspect, in addition to one or more of the preceding or following aspects, or in the alternative to some aspects, the platinum-based antineoplastic agent is selected from the group carboplatin, cisplatin, heptaplatin, lobaplatin, nedaplatin, oxaliplatin, phenanthriplatin, pyriplatin, and combinations thereof.

In a fourth aspect, in addition to one or more of the preceding or following aspects, or in the alternative to some aspects, the chemotherapy group includes a taxane.

In a fifth aspect, in addition to one or more of the preceding or following aspects, or in the alternative to some aspects, the chemotherapy group includes an anthracycline.

In a sixth aspect, in addition to one or more of the preceding or following aspects, or in the alternative to some aspects, the chemotherapy group includes doxorubicin.

In a seventh aspect, in addition to one or more of the preceding or following aspects, or in the alternative to some aspects, the ligand secured to the chemotherapy group includes a plurality of amine groups or acid groups.

In an eighth aspect, in addition to one or more of the preceding or following aspects, or in the alternative to some aspects, the reactive group on the ligand includes an azide group.

In a ninth aspect, in addition to one or more of the preceding or following aspects, or in the alternative to some aspects, the reactive group on the ligand includes an alkyne, tetrazine, fluorosydnones, or combinations thereof.

In a tenth aspect, in addition to one or more of the preceding or following aspects, or in the alternative to some aspects, the capture substrate includes a strained alkyne.

In an eleventh aspect, in addition to one or more of the preceding or following aspects, or in the alternative to some aspects, the strained alkyne of the capture substrate is selected from the group OCT (cyclooctyne), DIMAC (dimethoxyazacyclooctyne), DIFO (difluorinated cyclooctynes), BCN (bicyclo[6.1.0]nonyne), DIBO (dibenzocyclooctyne), DIFBO (difluorobenzocyclooctyne), DIBAC azadibenzocyclooctyne), BARAC (biarylazacyclooctynone), TMTH (3,3,6,6-tetramethyl-thiacycloheptyne) and combinations thereof.

In a twelfth aspect, in addition to one or more of the preceding or following aspects, or in the alternative to some aspects, the functionalized chemotherapy agent forms a covalent bond with the capture molecule on the capture substrate when brought in contact with the capture molecule.

In a thirteenth aspect, in addition to one or more of the preceding or following aspects, or in the alternative to some aspects, the functionalized chemotherapy agent and the capture molecule form a tri-azole ring upon reacting.

In a fourteenth aspect, a system for removing chemotherapy agent from a patient, the system is included having a chemotherapy agent can include a chemotherapy group secured to a ligand can include a reactive group capable of bonding to a capture molecule on a capture substrate; and a capture substrate containing a capture molecule capable of spontaneously forming a bond with the reactive group on the chemotherapy agent.

In a fifteenth aspect, in addition to one or more of the preceding or following aspects, or in the alternative to some aspects, the reactive group on the ligand includes an azide group.

In a sixteenth aspect, in addition to one or more of the preceding or following aspects, or in the alternative to some aspects, wherein: the chemotherapy group secured to a ligand includes an azide reactive group; and the capture substrate includes a polymer containing a strained alkyne; the strained alkyne selected from the group OCT (cyclooctyne), DIMAC (dimethoxyazacyclooctyne), DIFO (difluorinated cyclooctynes), BCN (bicyclo[6.1.0]nonyne), DIBO (dibenzocyclooctyne), DIFBO (difluorobenzocyclooctyne), DIBAC aza-dibenzocyclooctyne), BARAC (biarylazacyclooctynone), TMTH (3,3,6,6-tetramethyl-thiacycloheptyne), and combinations thereof.

In a seventeenth aspect, in addition to one or more of the preceding or following aspects, or in the alternative to some aspects, wherein the capture substrate includes a textile, membrane, foam, gel, web, porous bead, nanoparticle, electrospun material or combination of substrates.

In an eighteenth aspect, a method of removing chemotherapy agents from a patient, the method is included, the method providing a chemotherapy agent can include a reactive group; providing a removable capture substrate containing a capture molecule that spontaneously bonds to the reactive group of the chemotherapy agent; administering the chemotherapy agent to a patient; and sequestering the chemotherapy agent on the removable capture substrate.

In a nineteenth aspect, in addition to one or more of the preceding or following aspects, or in the alternative to some aspects, the ligand secured to the chemotherapy group includes a plurality of amine groups.

In a twentieth aspect, in addition to one or more of the preceding or following aspects, or in the alternative to some aspects, the ligand secured to the chemotherapy group includes a plurality of acid groups.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense.

BRIEF DESCRIPTION OF THE DRAWINGS

The present subject matter may be more completely understood and appreciated in consideration of the following detailed description of various embodiments in connection with the accompanying drawings.

While embodiments herein are susceptible to various modifications and alternative forms, specifics thereof have been shown by way of example and drawings and will be described in detail. It should be understood, however, that the scope herein is not limited to the particular examples described. On the contrary, the intention is to cover modifications, equivalents, and alternatives falling within the spirit and scope herein.

DETAILED DESCRIPTION

The present disclosure is directed to chemotherapy agents that have been modified to provide a functional group that can spontaneously covalently bond to a capture molecule. The capture molecule is typically secured to a removable substrate that is placed within the patient's body and then removed from a patient, or is positioned outside of the patient's body but in communication with the patient's blood. The bond between the chemotherapy agent and the capture molecule allows for subsequent removal of the chemotherapy agent by removal of the substrate containing the capture molecules.

More specifically, chemotherapy agents are modified with functional groups so that the chemotherapy agent can selectively and rapidly react with a biorthogonal counterpart capture molecule secured to a substrate, and this substrate can then be removed from the patient (if the substrate is positioned within the patient); or alternatively an external capture element can be used that contains the capture molecule secured to a substrate. As such, the chemotherapy agents and reactive substrate utilize "click chemistry" to selectively and effectively remove the chemotherapy agents from a patient's bloodstream.

The chemotherapy agent is typically synthesized or modified to provide a reactive group capable of bonding to a capture substrate. One example modification is to add an azide group to the chemotherapy agent. An azide group can be particularly useful because it is small, metabolically stable, and does not naturally exist in cells. Thus, azide groups generally have no competing biological side reactions and are particularly selective when binding to an appropriately-selected biorthogonal pair, such as a strained alkyne secured to a substrate.

Figure 1A:
FIG. 1A is a schematic diagram of a chemotherapy agent prior to addition of a reactive group.
Figure 1B:
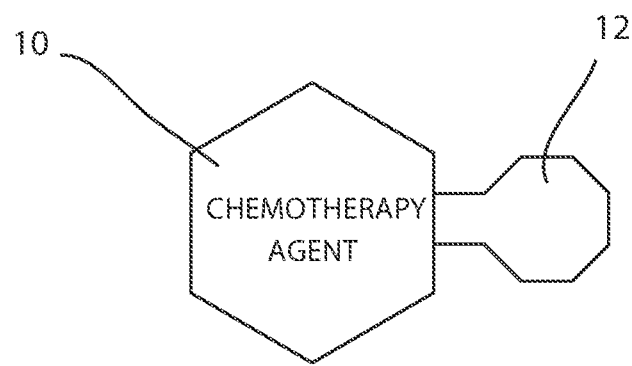
FIG. 1B is a schematic diagram of a chemotherapy agent after addition of a reactive group.

FIG. 1A is a schematic diagram of a chemotherapy agent 10 prior to addition of a reactive group 12, and FIG. 1B is a schematic of a chemotherapy agent 10 after addition of the reactive group 12. FIG. 1B shows the chemotherapy agent 10 with the reactive group 12, such as an azide, attached. The chemotherapy agent 10 can be initially formed, and then modified to include the reactive group 12, or the reactive group 12 can simultaneously be added during synthesis of the overall chemotherapy agent or modified chemotherapy agent.

Thus, the inclusion of one or more reactive groups 12 can be done at various stages of creation of the chemotherapy agent.

Figure 2:
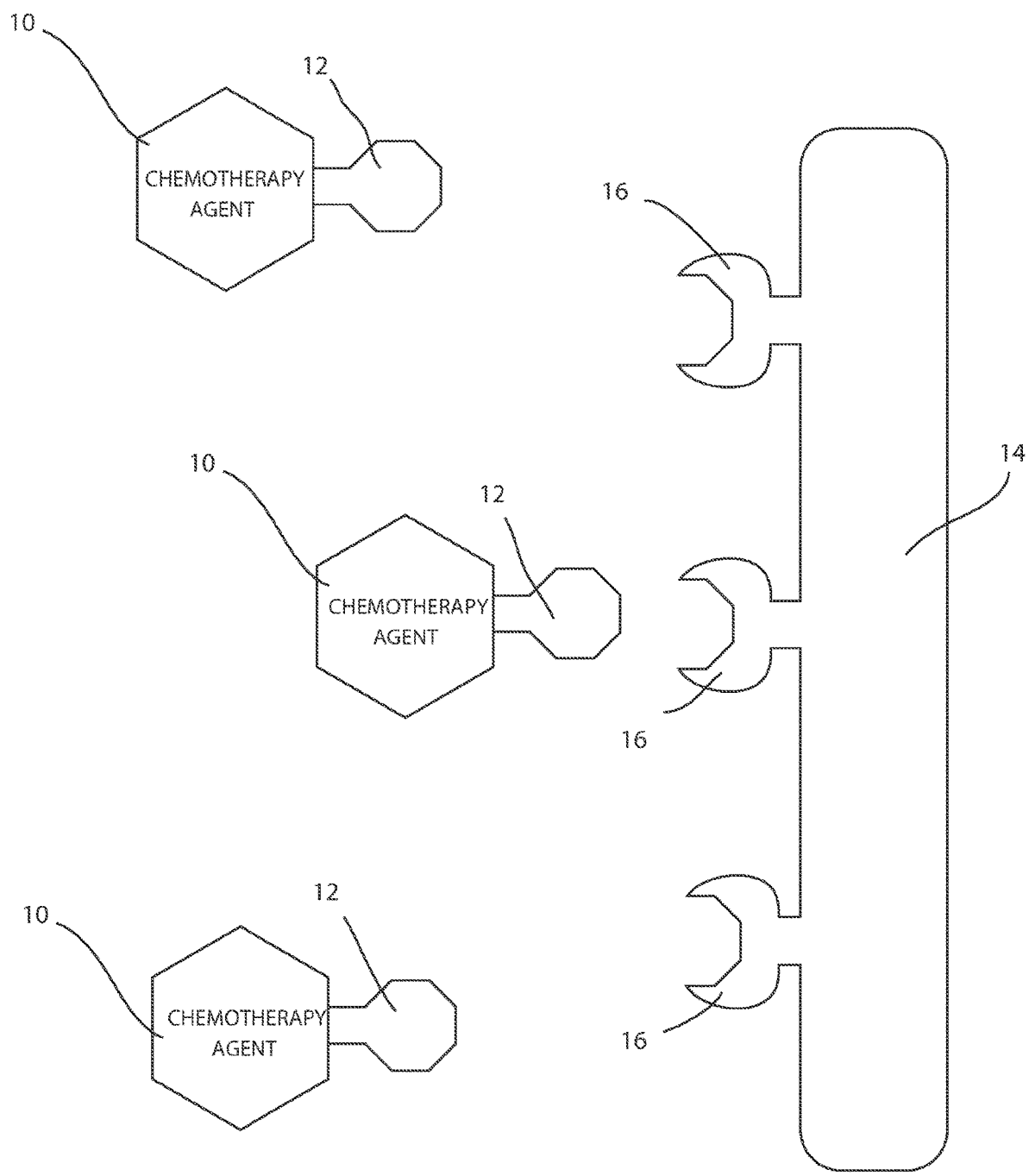
FIG. 2 is a schematic diagram of chemotherapy agents to which reactive groups have been added, shown with a reactive substrate.

Referring now to FIG. 2, a schematic representation is shown of molecules of chemotherapy agent 10 from FIGS.

1A and 1B with reactive groups 12 (such as azides or 1,2,3-triazole groups), along with a capture substrate 14. The capture substrate 14 includes capture molecules 16, such as strained alkynes, capable of a spontaneous, irreversible reaction with reactive groups 12. The capture molecule 16 can include, for example, OCT (cyclooctyne), DIMAC (dimethoxyazacyclooctyne), DIFO (difluorinated cyclooctynes), BCN (bicyclo[6.1.0]nonyne), DIBO (dibenzocyclooctyne), DIFBO (difluorobenzocyclooctyne), DIBAC aza-dibenzocyclooctyne), BARAC (biarylazacyclooctynone), TMTH (3,3,6,6-tetramethyl-thiacycloheptyne) and mixtures thereof. In FIG. 2 the capture molecules 16 are shown secured to the capture substrate 14, but without any of the molecules of the chemotherapy agent 10 yet reacted with the capture molecules 16.

Figure 3:
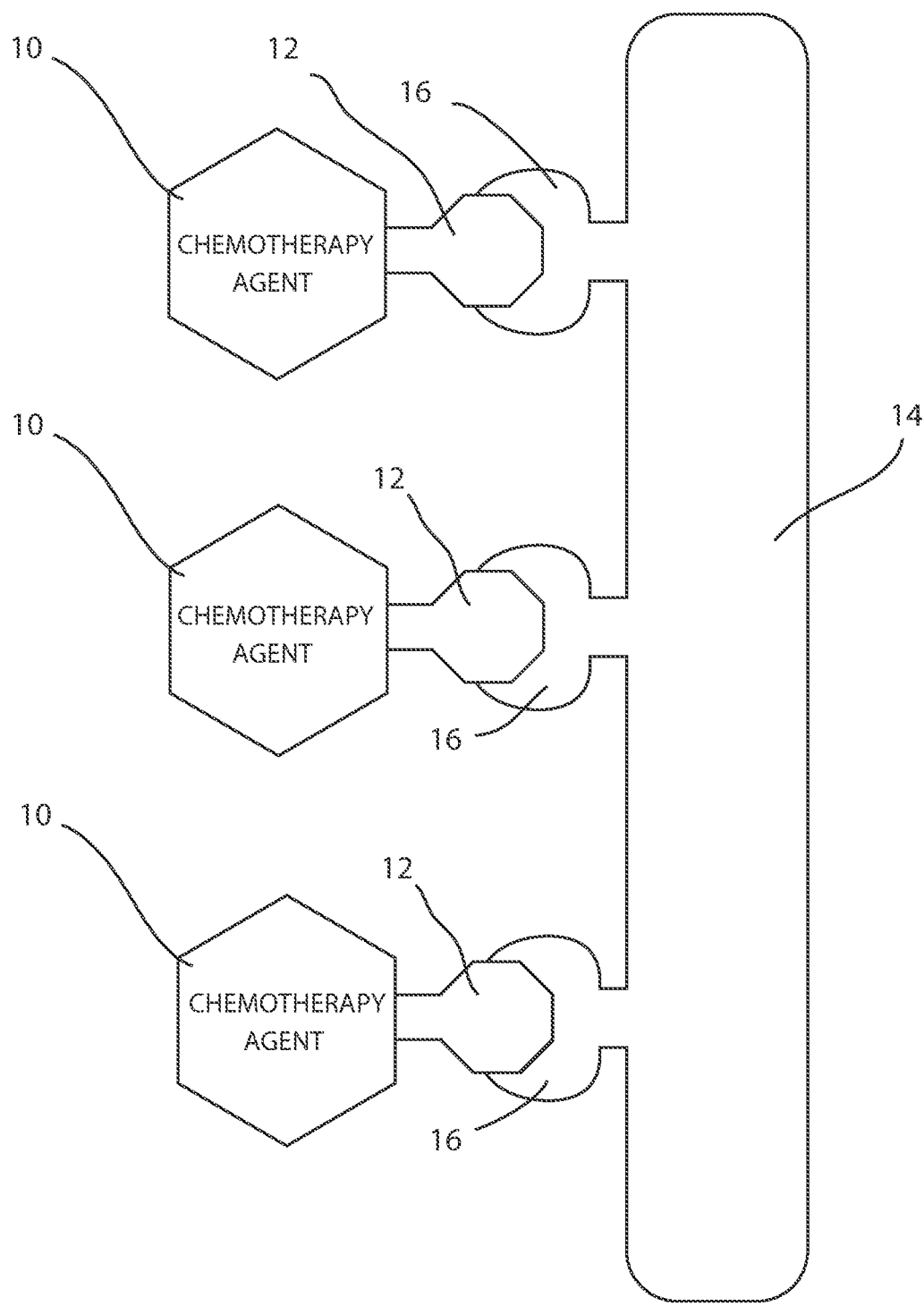
FIG. 3 is schematic diagram of chemotherapy agents to which reactive groups have been added, showing the chemotherapy agents sequestered on a reactive substrate.

FIG. 3 is a schematic of molecules of chemotherapy agent 10 with reactive groups 12 attached, showing the chemotherapy agents 10 sequestered on the capture substrate 14 by way of the reactive groups 12 of the chemotherapy agent 10 having reacted with the capture molecules 16 of the capture substrate 14. The capture substrate 14 can be, for example, a polymeric film, gel, web, fabric, foam, mesh, porous bead, nanoparticle, electrospun material, or other material to which the capture molecules 16 have been secured, or a combination of materials. After the capture molecules 16 bond to chemotherapy agents 10, the capture substrate 14 and chemotherapy agents 10 can be removed from a patient. For example, in some implementations the capture substrate 14 is placed within a blood vessel in a patient, such as blood vessels upstream of the kidney (for example, in the left or right renal artery, or the interior vena cava). Alternatively, the capture substrate 14 is positioned outside of the patient's body within a housing connected by intravenous catheters to the patient's bloodstream.

More generally, the reactive group of the ligand can be, for example, an azide, alkyne, tetrazine, fluorosydnones, or combinations thereof. The azide group is particularly appropriate because it is small, metabolically stable, and does not naturally exist in cells. Thus, it has no competing biological side reactions. The alkyne is not as small, but it still has the stability and bioorthogonality useful for selective removal of chemotherapy agents from the bloodstream.

Figure 4:
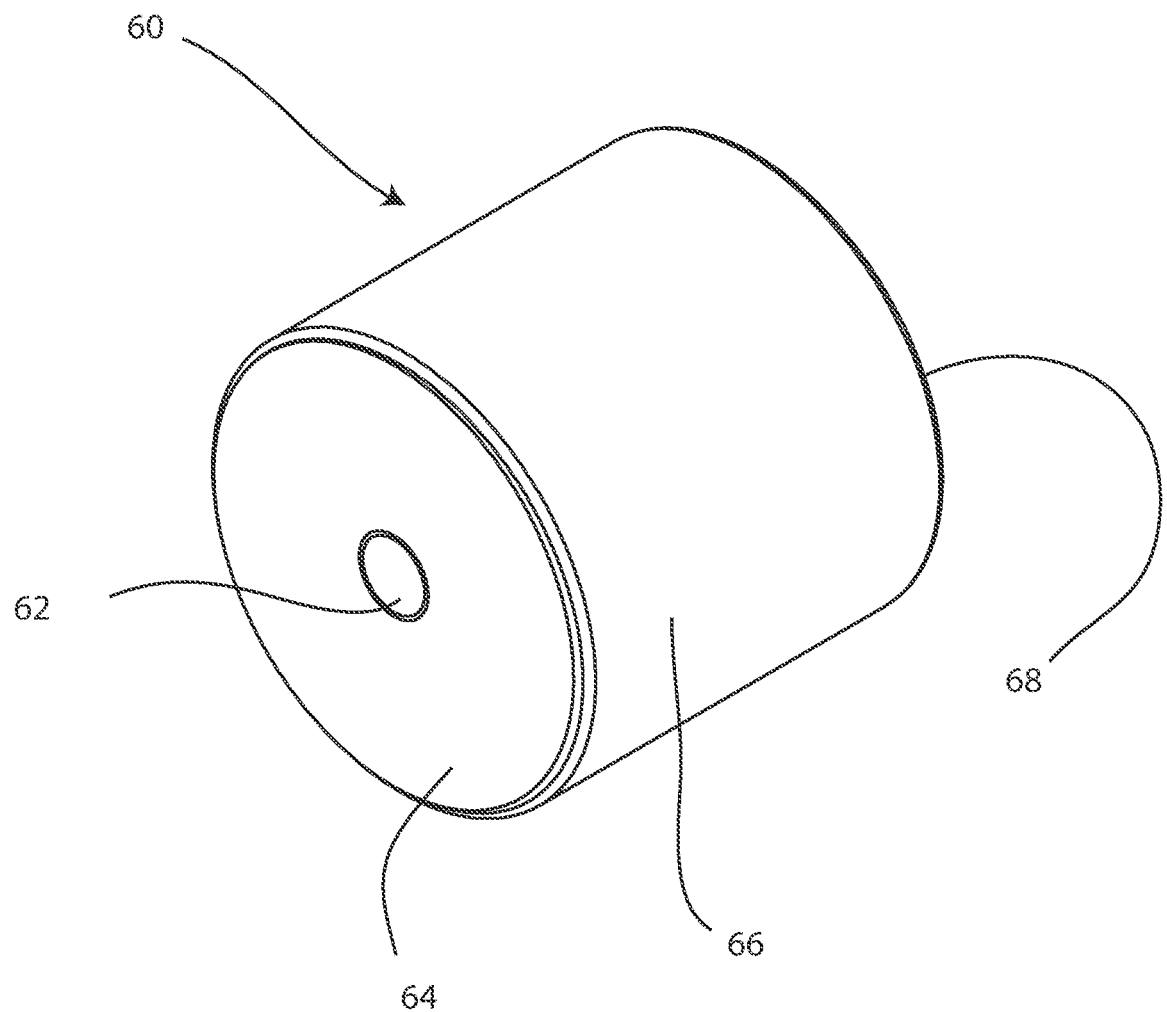
FIG. 4 is a perspective view of an article for chemotherapy agent capture configured for the flow of blood through the article to retain the chemotherapy agent.

FIG. 4 is a perspective view of capture element 60 containing a chemotherapy agent capture device configured for the flow of blood through the element to retain the chemotherapy agent. The capture element 60 includes a housing 66, along with an inlet 62 on a first end 64 of the housing 66 for receiving blood containing chemotherapy agent, plus an outlet (not shown) opposite the inlet 62 on the second end 68 of the housing, through which the blood containing substantially less chemotherapy agent exits the housing 66. Within the housing 66 is capture media. The capture media contains capture substrate as described herein, such as a capture substrate having exposed strained alkynes available for reacting with functionalized chemotherapy agent, such as platinum ligands functionalized with an azide group.

Figure 5:
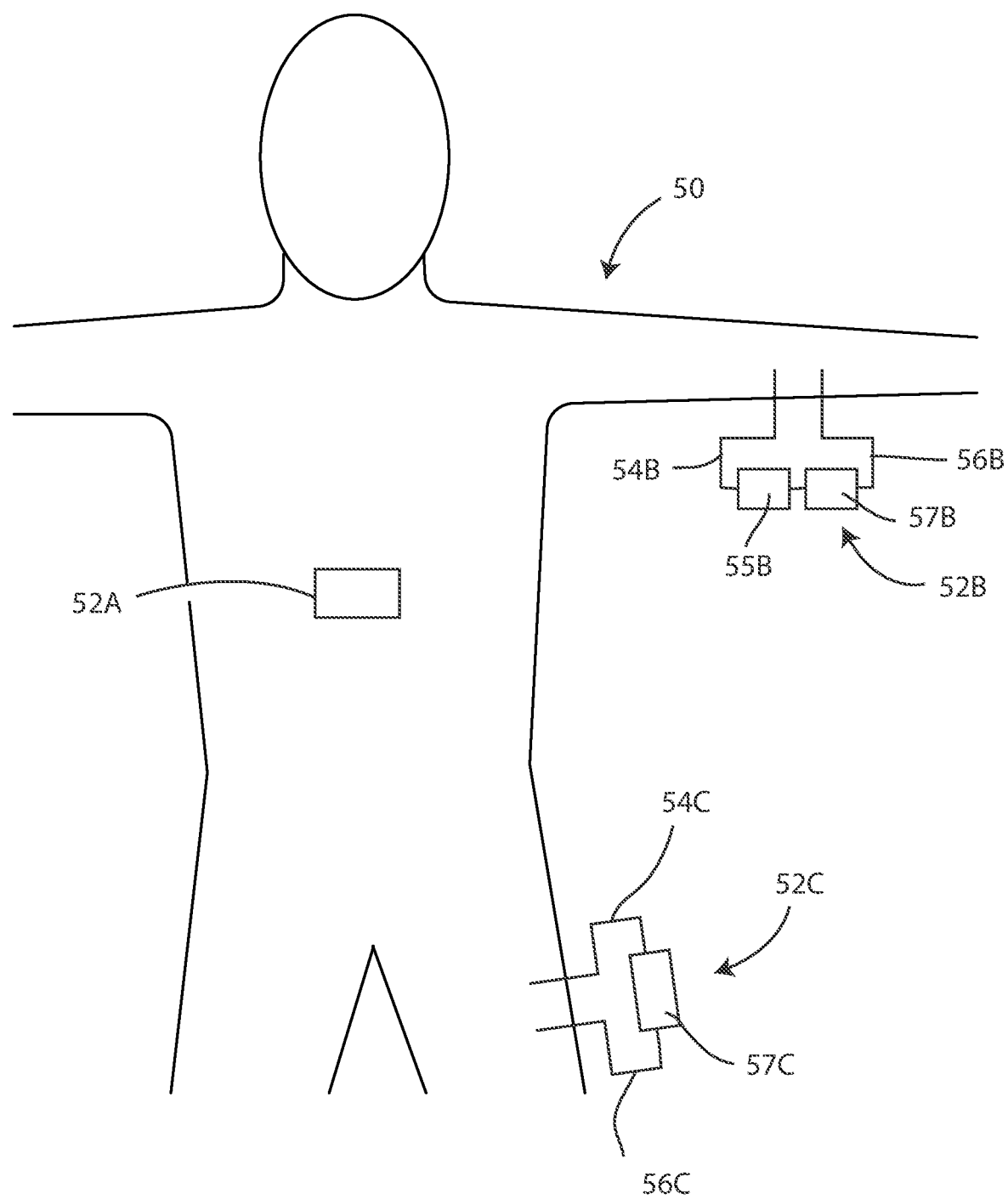
FIG. 5 is a schematic diagram showing example locations of chemotherapy agent capture inside and outside a patient's body.

In reference to FIG. 5, a schematic diagram of a patient 50 shows example locations 52A, 52B, 52C for a chemotherapy agent capture device. Patient 50 is shown as a human outline, but examples are not so limited and may include any mammal. FIG. 5 is simplified diagram of the capture system, and not drawn to scale, showing capture systems schematically only. The locations are shown in FIG. 5 for illustrative purposes, indicating how the location of the chemotherapy agent capture device can be varied. Locations 52A, 52B and 52C are all locations in which the chemotherapy agent capture device is brought in contact with a blood vessel, typically a blood vessel downstream of a tumor. For example, location 52A show a location of an internal organ, such as a liver, while location 52B and 52C are external to the body. In these implementations the chemotherapy agent capture substrate can be applied in the form of a textile, membrane, foam, gel, web, porous bead, nanoparticle, electrospun material, or other substance inserted into the blood vessel and then removed after the medical procedure is completed and adequate chemotherapy agent has been scavenged. Location 52B is shown on a peripheral body location, with an intravenous catheter 54B leading to an optional pump 55B that flows into a sequestering element 57B and then back into the patient 50 by way of intravenous catheter 56B. The sequestering element 57B contains a textile, membrane, foam, gel, web, porous bead, nanoparticle, electrospun material, or other substance with exposed sequestering agent for binding the chemotherapy agent. Alternative location 52C for removing chemotherapy agents includes intravenous catheter 54C leading to sequestering element 57C and then flow out through return catheter 56C. Location 52C is depicted without an auxiliary pump, although generally adequate pressure is necessary to return the blood to the patient.

External positioning of the chemotherapy agent capture material at location 52B and 52C are less invasive than inserting the chemotherapy agent capture material into location 52A, but is also typically slower to remove the chemotherapy agent and allows initial exposure of the kidneys and other tissues to heightened levels of chemotherapy agent.

Desired properties for the ligand comprising the reactive group and the related capture substrate include strong selectivity, generally biological inertness, generally biological and chemical inertness, favorable kinetics, and biocompatibility. With regard to selectivity, it is desirable that the reaction be selective between functional groups to avoid side reactions with biological compounds. With regard to biological inertness, desirably the reactive group on the chemotherapy ligand should not possess reactivity capable of disrupting the native chemical functionality of the patient. Regarding chemical inertness, the covalent link between the reactive group on the ligand and the capture molecule on the capture substrate should be strong and inert to biological reactions.

The reactive group of the chemotherapy agent is reactive with groups on the capture substrate. The capture substrate can be, for example, a substrate or polymer having exposed strained alkyne functional groups. The reactive receptor group can be, for example, OCT (cyclooctyne), DIMAC (dimethoxyazacyclooctyne), DIFO (difluorinated cyclooctynes), BCN (bicyclo[6.1.0]nonyne), DIBO (dibenzocyclooctyne), DIFBO (difluorobenzocyclooctyne), DIBAC aza-dibenzocyclooctyne), BARAC (biarylazacyclooctynone), TMTH (3,3,6,6-tetramethyl-thiacycloheptyne) and mixtures thereof.

The capture substrate is, for example, porous so that blood and chemotherapy agent flows through the substrate so as to remove the chemotherapy agent. In certain embodiments the capture material can also have anti-thrombotic molecules attached to the surface, such as like Heparin. Alternatively, the substrate can be relatively smooth, allowing blood and chemotherapy agent to flow along the surface of the substrate until the chemotherapy agent is captured. Suitable capture substrates include, for example, polyvinyl alcohol (PVA) to which the capture molecule (such as a moiety containing a strained alkyne) has been secured. The modified chemotherapy agent is brought in contact with the substrate after the chemotherapy procedure, such as by insertion into a blood vessel or retained in a chamber outside of the body but through which blood is passed.

The chemotherapy agents described herein can be used as part of a method of removing chemotherapy agents from a patient, the method comprising providing a chemotherapy agent having a reactive group; providing a removable capture substrate; administering the chemotherapy agent to the patient; and sequestering the chemotherapy agent on the removable capture substrate.

The chemotherapy agent can be captured and removed as part of a system comprising a chemotherapy group secured to a ligand comprising a reactive group capable of bonding to a capture substrate; and a capture substrate. The chemotherapy group secured to a ligand can include an azide reactive group; and the capture substrate can include a polymer containing a strained alkyne; the strained alkyne selected from the group OCT (cyclooctyne), DIMAC (dimethoxyazacyclooctyne), DIFO (difluorinated cyclooctynes), BCN (bicyclo[6.1.0]nonyne), DIBO (dibenzocyclooctyne), DIFBO (difluorobenzocyclooctyne), DIBAC aza-dibenzocyclooctyne), BARAC (biarylazacyclooctynone), TMTH (3,3,6,6-tetramethyl-thiacycloheptyne) and mixtures thereof.

In practice, the chemotherapy agents are typically administered locally or regionally (e.g. as an intratumoral or adjuvant administration), with the locally affected tissue being the primary target. As the chemotherapy agent begins to diffuse off-target, a drug capture macromolecular structure is used to capture off-target drug and minimize its effects away from the site of interest.

Example platinum ligands modified to incorporate azide functional groups include the following, in which a platin molecule is modified to include an azide group, and then once in the bloodfield (systemic and off-target), a bioothogonal capture macromolecule reacts with the azide group on the modified platinum ligand, immobilizing it from further circulation:

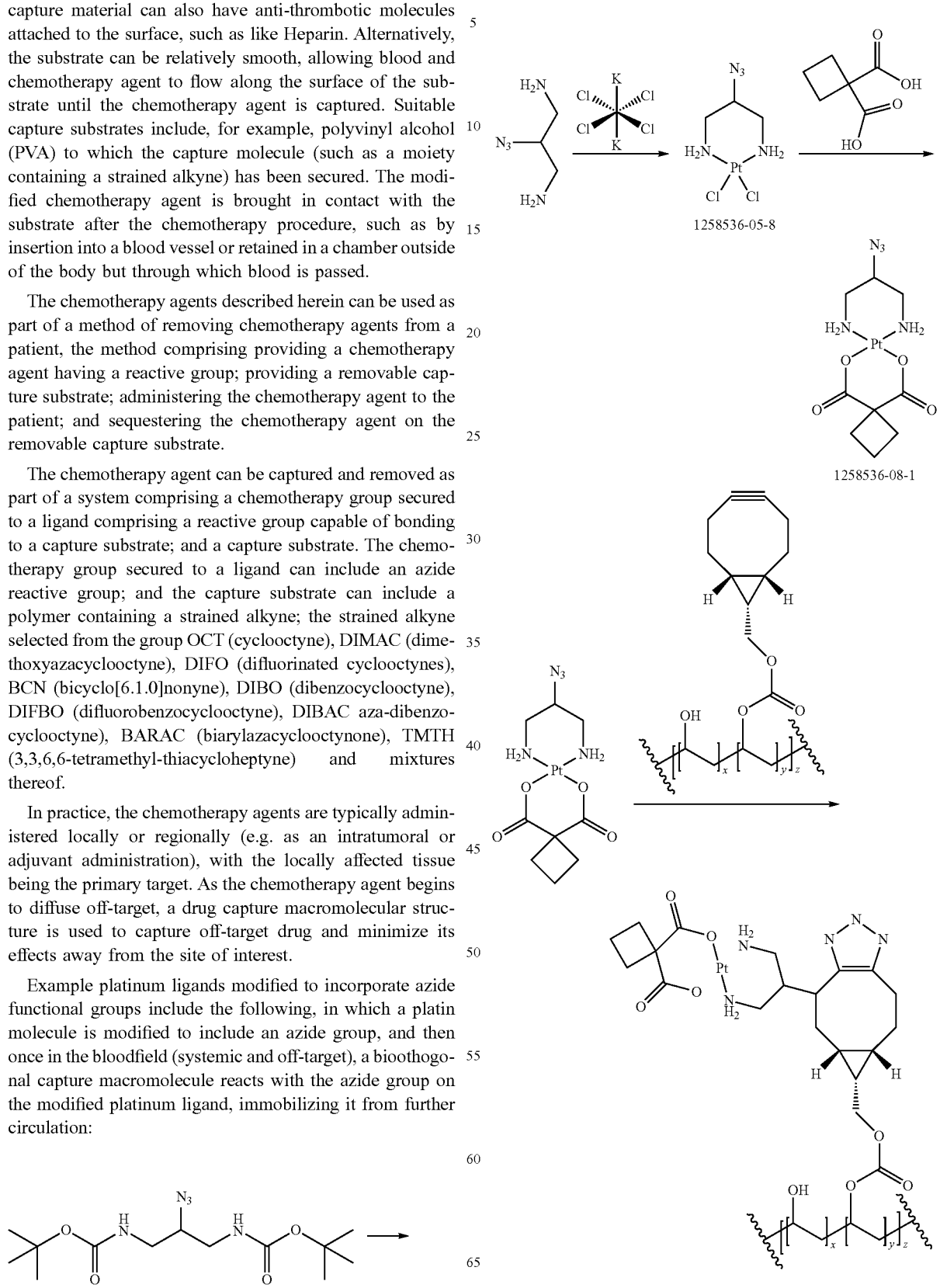

In this example a carboplatin having an azide group is reacted. In various alternative embodiments different platins can be used, including carboplatins, plus cisplatin, heptaplatin, lobaplatin, nedaplatin, oxaliplatin, phenanthriplatin, and pyriplatin:

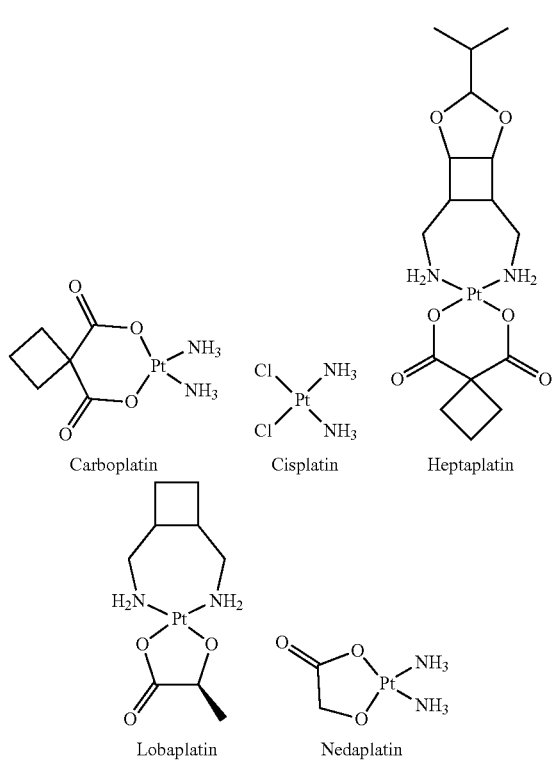

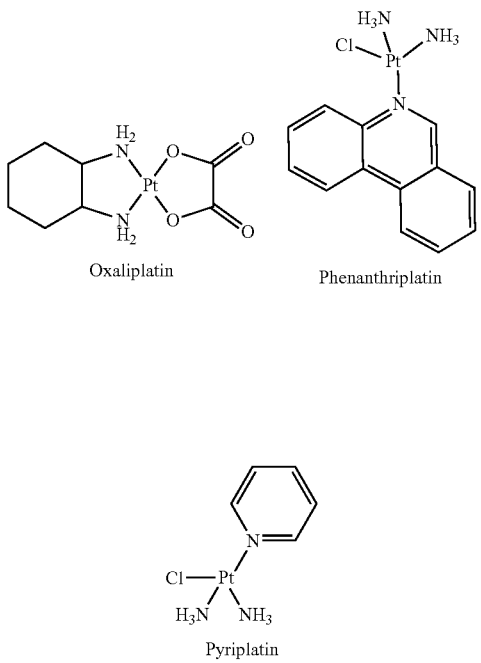

Alternative chemotherapy agents can be created having click chemistry properties to allow for removal from a bloodstream when the chemotherapy agent has moved away from the target site. For example, doxorubicin can be modified with an azide at the nitrogen position, and captured using a polymer-bound strained cycloalkyne as follows:

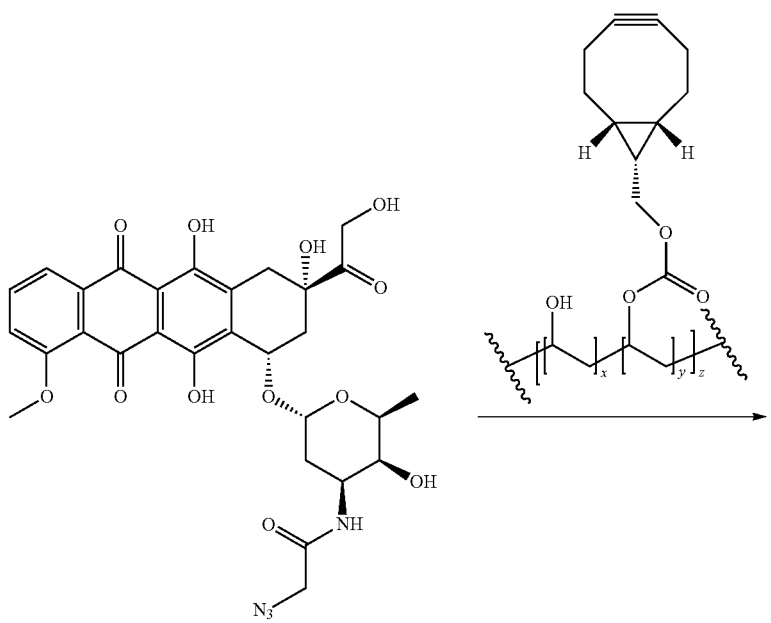

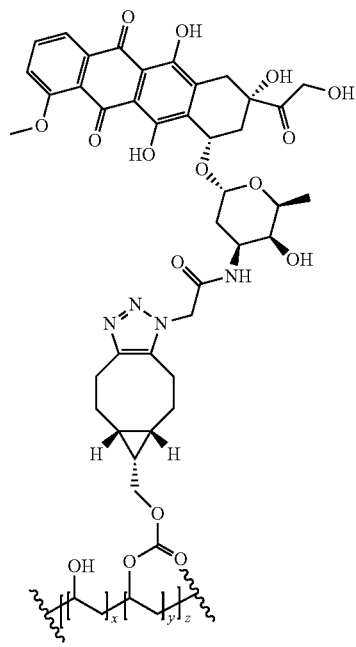
Various portions of the molecule can be modified without excessively affecting the ability of anthracyclines, such as doxorubicin, to treat cancer, such as modification of the doxorubicin at the nitrogen position:
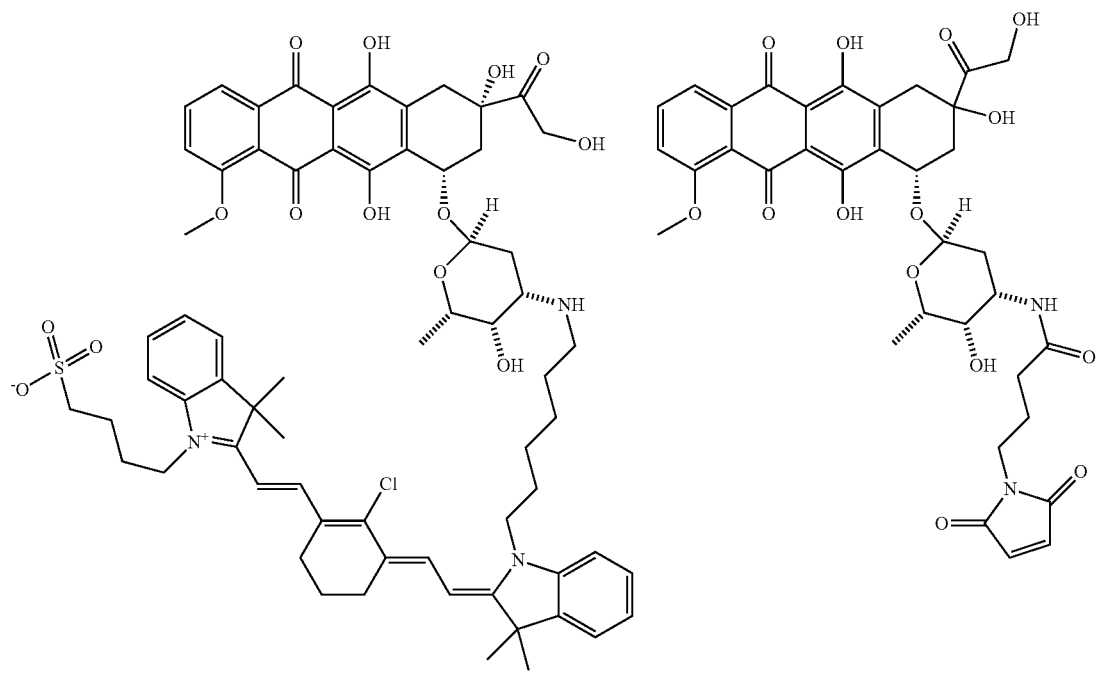

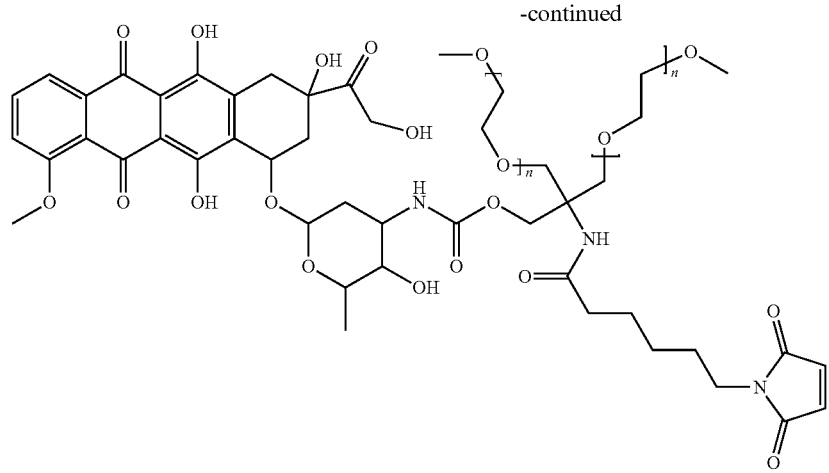
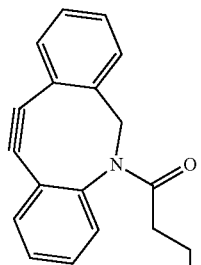
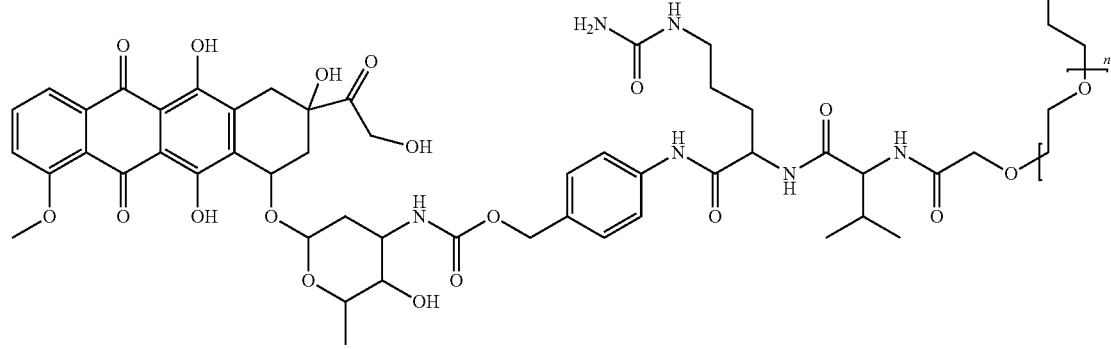
Alternatively, example taxane modification for strain-promoted azide-alkyne click coupling includes:
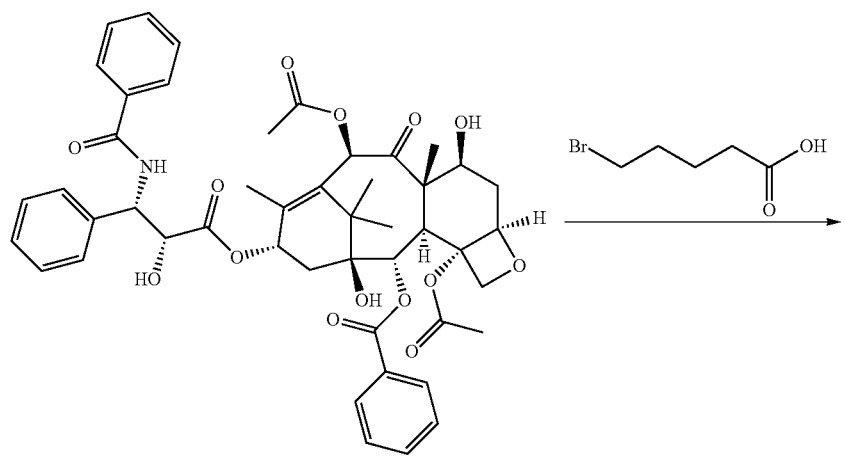

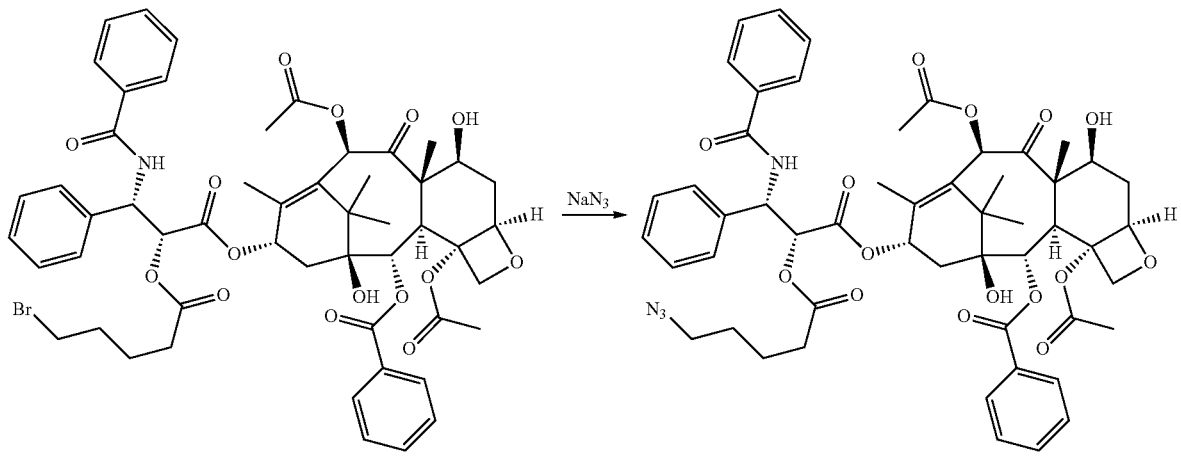

As the drug begins to diffuse off-target, a click capture macromolecule in the blood field captures it, and prevents it from interfering elsewhere.

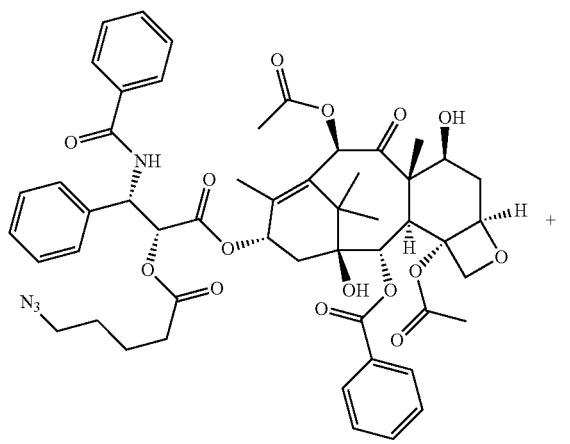

+

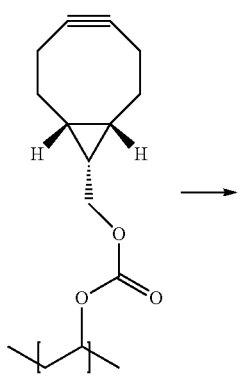

→

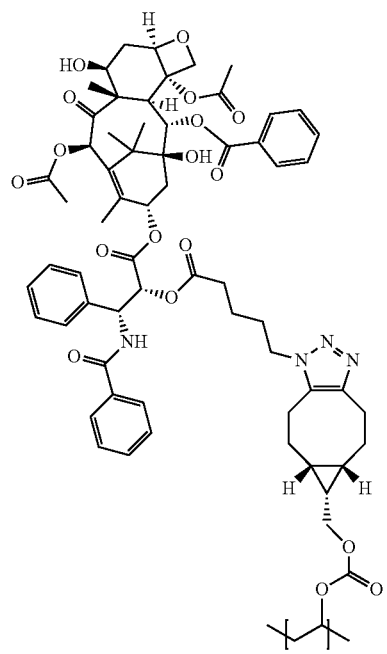

The chemotherapy agents are administered locally or regionally (e.g. as an intratumoral or adjuvant administration), with the locally affected tissue being the primary target. As drug begins to diffuse off target, a palliative drug capture macromolecular click structure is used to capture off-target drug, and minimize its effects away from the site of interest.

Similarly, taxane, such as paclitaxel, can be modified to be click-capturable:

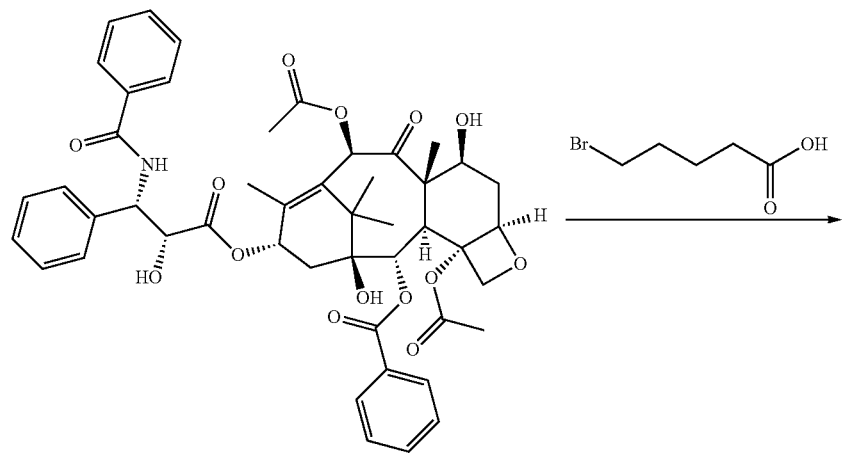
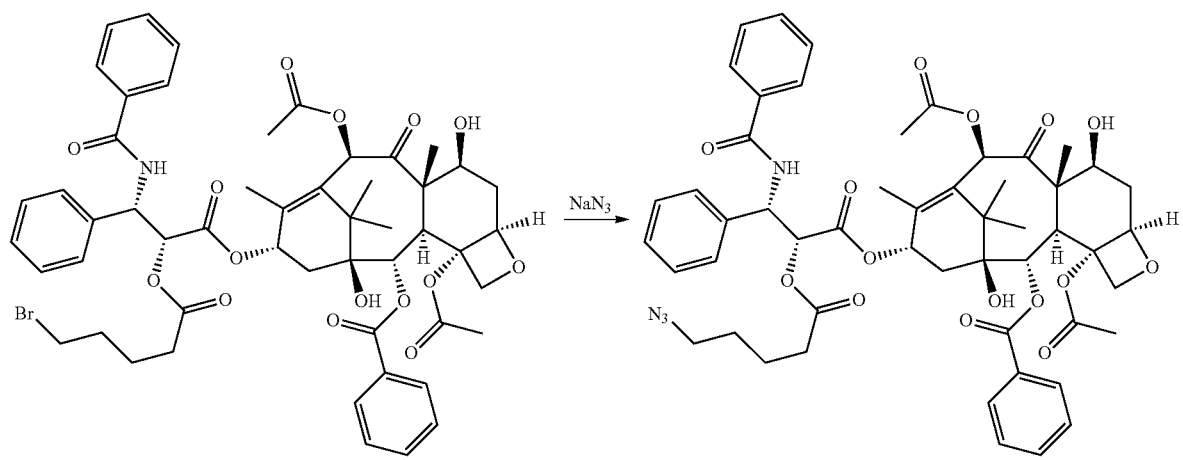
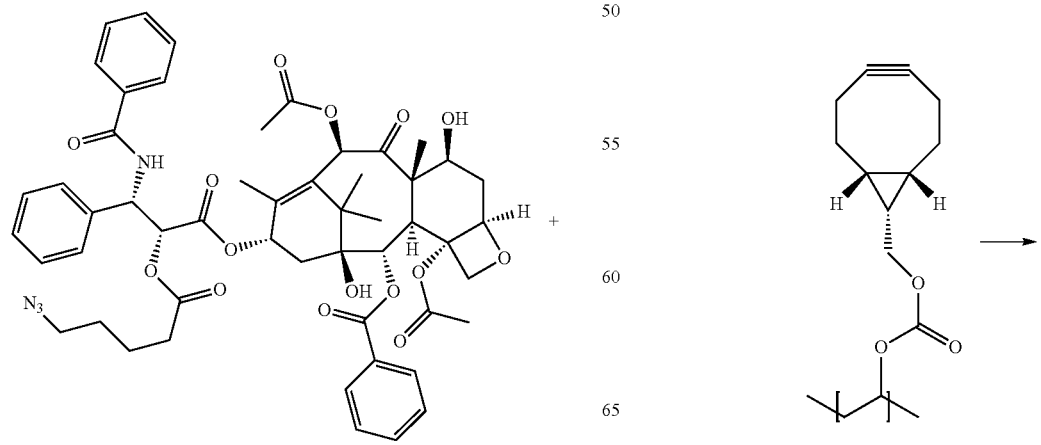
-continued

-continued

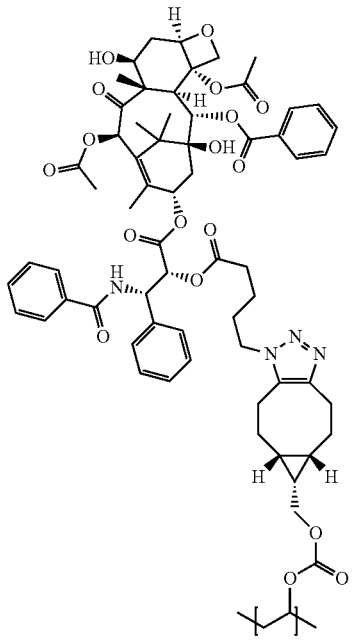

It should also be noted that, as used in this specification and the appended claims, the phrase "configured" describes a system, apparatus, or other structure that is constructed to perform a particular task or adopt particular characteristics. The phrase "configured" can be used interchangeably with other similar phrases such as "arranged", "arranged and configured", "programmed" "constructed and arranged", "constructed", "manufactured and arranged", and the like.

All publications and patent applications in this specification are indicative of the level of ordinary skill in the art to which the present technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

We claim:

1. A functionalized chemotherapy agent, the functional chemotherapy agent comprising:
   a chemotherapy group; and
   a ligand secured to the chemotherapy group, the ligand comprising a reactive group capable of bonding to a capture molecule on a capture substrate;
   wherein the functionalized chemotherapy agent is bonded to a removable capture molecule on a removable capture substrate comprises a textile, membrane, foam, gel, web, porous bead, nanoparticle, electrospun material or combination of substrates.

2. The functionalized chemotherapy agent of claim 1, wherein the chemotherapy group comprises a platinum-based antineoplastic agent.

3. The functionalized chemotherapy agent of claim 2, wherein the platinum-based antineoplastic agent is selected from the group carboplatin, cisplatin, heptaplatin, lobaplatin, nedaplatin, oxaliplatin, phenanthriplatin, pyriplatin, and combinations thereof.

4. The functionalized chemotherapy agent of claim 1, wherein the chemotherapy group comprises a taxane.

5. The functionalized chemotherapy agent of claim 1, wherein the chemotherapy group comprises an anthracycline.

6. The functionalized chemotherapy agent of claim 1, wherein the chemotherapy group comprises doxorubicin.

7. The functionalized chemotherapy agent of claim 1, wherein the ligand secured to the chemotherapy group comprises a plurality of amine groups or acid groups.

8. The functionalized chemotherapy agent of claim 1, wherein the reactive group on the ligand comprises an azide group.

9. The functionalized chemotherapy agent of claim 1, wherein the reactive group on the ligand comprises an alkyne, tetrazine, fluorosydnones, or combinations thereof.

10. The functionalized chemotherapy agent of claim 1, wherein the capture substrate comprises a strained alkyne.

11. The functionalized chemotherapy agent of claim 10, wherein the strained alkyne of the capture substrate is selected from the group OCT (cyclooctyne), DIMAC (dimethoxyazacyclooctyne), DIFO (difluorinated cyclooctynes), BCN (bicyclo[6.1.0]nonyne), DIBO (dibenzocyclooctyne), DIFBO (difluorobenzocyclooctyne), DIBAC azadibenzocyclooctyne), BARAC (biarylazacyclooctynone), TMTH (3,3,6,6-tetramethyl-thiacycloheptyne) and combinations thereof.

12. The functionalized chemotherapy agent of claim 1, wherein the functionalized chemotherapy agent and the capture molecule form a tri-azole ring upon reacting.

* * * * *